United States Patent [19]
Roberts

[11] Patent Number: 5,597,357
[45] Date of Patent: Jan. 28, 1997

[54] SELF-DRILLING SCREW

[75] Inventor: David J. Roberts, Mornington, Australia

[73] Assignee: W. A. Deutsher Pty. Ltd., Moorabbin, Australia

[21] Appl. No.: 446,969

[22] Filed: May 22, 1995

Related U.S. Application Data

[62] Division of Ser. No. 257,308, Jun. 9, 1994, Pat. No. 5,487,633.

[51] Int. Cl.$^6$ ................................................ B21H 3/02
[52] U.S. Cl. ................................................................ 470/9
[58] Field of Search ...................................... 470/9, 10, 66, 470/81; 411/387, 187, 399

[56] References Cited

U.S. PATENT DOCUMENTS

| | | | |
|---|---|---|---|
| 3,661,046 | 5/1972 | Waud et al. | 411/369 |
| 3,812,639 | 5/1974 | Sygnator | 411/387 |
| 4,516,893 | 5/1985 | Barth | 411/399 |
| 4,749,319 | 6/1988 | Sygnator | 411/399 |
| 4,764,066 | 8/1988 | Terrell et al. | 411/399 |
| 4,781,506 | 11/1988 | Roberts et al. | 411/387 |
| 5,356,253 | 10/1994 | Whitesell | 411/399 |

FOREIGN PATENT DOCUMENTS

| | | |
|---|---|---|
| 18760/62 | 12/1963 | Australia . |
| 29822/63 | 10/1964 | Australia . |
| 64759/63 | 4/1967 | Australia . |
| 67960/65 | 6/1967 | Australia . |
| 64770/69 | 6/1971 | Australia . |
| 52046/73 | 8/1974 | Australia . |
| 34029/84 | 4/1985 | Australia . |

*Primary Examiner*—Lowell A. Larson
*Assistant Examiner*—Thomas C. Schoeffler
*Attorney, Agent, or Firm*—Schwartz & Weinrieb

[57] ABSTRACT

A self-drilling screw is provided which is suitable for use with both relatively thick metal plates and relatively thin metal sheets. The screw is formed from a blank 1 which includes a shank 2 extending between a head 3 and drilling tip 4. The shank 2, adjacent the head 3, is formed with a frusto-conical enlargement 8. A thread 10, when formed in shank 2, is extended into enlargement 8 so as to create a final part 11 of the thread which, in use of the screw with sheet metal 12, distorts the sheet metal such that it firmly locks onto the enlargement 8. A shallow recess 6 is provided in the underside of head 3 surrounding the frusto-conical enlargement 8.

18 Claims, 2 Drawing Sheets

SELF-DRILLING SCREW

This application is a division of application Ser. No. 08/257,308, filed Jun. 9, 1994, now U.S. Pat. No. 5,487,633.

FIELD OF THE INVENTION

This invention relates to fastening screws of the kind having a drilling tip end and which are adapted to form a thread in the hole created by the drilling tip. Such screws are commonly referred to as self-drilling screws even though they also function as self-tapping screws.

BACKGROUND OF THE INVENTION

Self-drilling screws have been known for a considerable period of time, and have undergone a substantial amount of development. In spite of that development, it remains necessary for such screws to have different characteristics according to some circumstances of use. In particular, screws which are intended to be used with metal plate, that is, relatively thick material, will have different characteristics from those intended for use with sheet metal, that is relatively thin material.

A screw intended for use in sheet metal will normally have a relatively deep thread because a relatively low torque will be required for the screw to form a complimentary thread, that is, the tapped thread, in the hole formed by the drilling tip. It is difficult however, for the screw to form the same depth of thread in metal plate, and in some cases the torque required is excessive. That has led to the development of two classes of screws within the same diameter range. The screws in each class have a thread of the same crest and root diameters, but the drill tip diameter is different in each case.

A relatively large drill tip diameter is required for the class of screw intended for use in metal plate, as that reduces the depth of the tapped thread and therefore reduces the torque required to produce that thread. The same screw is not satisfactory for use in sheet metal because there is insufficient depth in the tapped thread. In the case of sheet metal, there needs to be a substantial amount of engaging thread surface between the screw and the sheet metal in order to impart sufficient resistance to stripping of the tapped thread. If the depth of the tapped thread is relatively small, a relatively low torque applied to the screw during the tightening operation may be sufficient to strip that thread.

The difficulty which flows from the foregoing is that users of such screw products need to carry both classes of such screw products, and need to make the correct selection according to the use of the particular screw in any particular circumstances. Selection can be a problem unless there is a clearly defined separation between the two classes of screw products, because the only difference between screws of the same thread diameter is the diameter of the drill tip and that may not be a clearly visible difference in many cases.

OBJECTS OF THE INVENTION

It is an object of the present invention to provide a self-drilling screw which is usable in a relatively wide variety of circumstances. It is an object of the invention in one particular form to provide a self-drilling screw which is satisfactory for use in both sheet metal and metal plate applications.

SUMMARY OF THE INVENTION

Accordingly, in accordance with a first aspect of the invention there is provided a self-drilling screw suitable for use with metal plate and metal sheet, the screw comprising a shank having a head containing driving means at one end and a drilling tip at the other end, a thread on the shank extending between the drilling tip and the head, an end portion of the shank adjacent the head and an end portion of the thread which is formed therein being adapted to distort a relatively thin metal sheet, when the screw is used with such a sheet, into wedging inter-engagement with the end portion of the shank.

A self-drilling screw according to the invention may be characterised in that a portion of the screw thread is formed on a sloping surface which is adjacent the head of the screw and slopes radially inwards towards the drill tip. It will usually be the case that the axial extent of the sloping surface is relatively small by comparison with the overall length of the screw shank.

According to a second aspect of the invention there is provided a self-drilling screw which comprises an elongate shank, an enlarged head at one end of the shank, a drilling tip at the other end of the shank, an enlarged shank section which is located adjacent the head and the cross-sectional size of which progressively increases in a direction away from the drilling tip, and a thread formed on the portion of the shank extending between the head and the drilling tip and extending into the enlarged section.

According to a third aspect of the invention, there is provided a method of forming a self-drilling screw in which the screw thread is formed by a thread rolling operation. The method is characterised in that a screw blank having a shank and a head and a drilling tip at respective opposite ends of that shank, is formed so that an enlargement is provided on the shank adjacent to the head. The enlargement is positioned to be engaged by the thread rolling dies as those dies approach the screw head, and as a consequence the dies displace material from the enlargement to form a final part of the thread. It is preferred that the enlargement is a frusto-conical section of the shank which increases in diameter towards the screw head, but other forms of enlargement could be adopted.

A screw according to the invention is preferably arranged so that the drilling tip will form a hole having a diameter which has a relationship with the thread crest diameter such that the screw is suitable for tapping into relatively thick metal, that is, metal plate. When the screw is tapped into relatively thin metal, that is, sheet metal, it is found that the final thread part referred to above causes a distortion of the sheet metal such that it tends to lock around the screw shank. Tests have revealed that when the screw is used with sheet metal, the resistance to stripping torque is on the order of three times greater than that of a comparable screw not made in accordance with the invention.

BRIEF DESCRIPTION OF THE DRAWINGS

It will be convenient to hereinafter describe the invention in greater detail by reference to the attached drawings which show an example embodiment of the invention.

DETAILED DESCRIPTION OF THE PREFERRED EMBODIMENT

Figure 1:
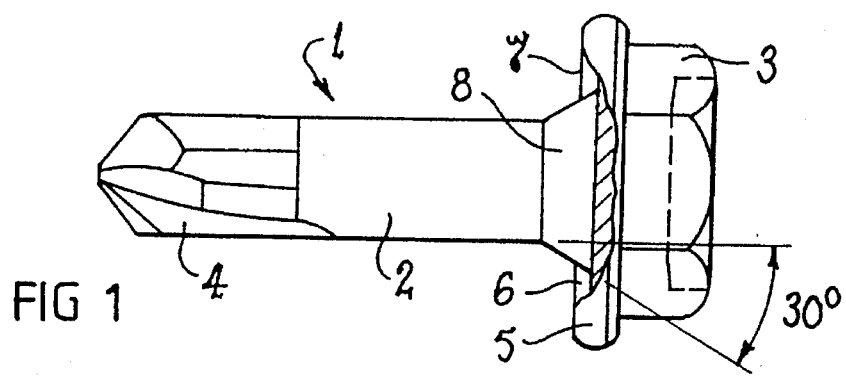
FIG. 1 is a side elevational view illustrating a blank from which a screw in accordance with the invention is formed.

FIG. 1 shows a screw blank 1 which is made in accordance with one embodiment of the invention. The blank 1 has a cylindrical shank 2, and a head 3 and a drilling tip 4 are formed at respective opposite ends of the shank 2. The head 3 is shown as having a hexagonal form, but that is not essential. Also, in the particular arrangement shown, an integral flange 5 is formed at the under side of the head 3, and a shallow recess 6 is formed in the under surface 7 of the flange 5.

A particular feature of the blank 1 is the provision of a frusto-conical enlargement 8 at the head end of the shank 2. The diameter of that enlargement 8 increases towards the head 3, and the axial extent of the enlargement 8 is relatively small. As shown, the enlargement 8 extends into the recess 6 and has an axial extent which is on the order of three times the axial depth of the recess 6. Preferably, the axial extent of the enlargement 8 is on the order of 2.5 to 4 times the axial depth of the recess 6, but other relationships could be adopted. In the particular arrangement shown, the surface of the enlargement 8 slopes at an angle of approximately 30° with respect to the longitudinal axis of the screw, but satisfactory results can be obtained with variations of that angle, for example, the angle may have a range of between about 15° and 45°.

Figure 2:
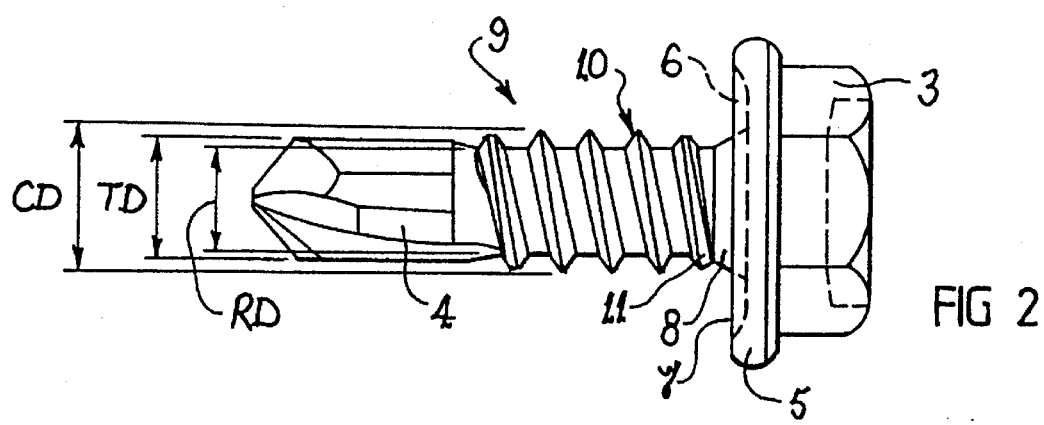
FIG. 2 is a side elevational view of a screw formed from the blank of FIG. 1.

FIG. 2 shows a completed screw 9 which is formed from the blank 1 of FIG. 1. In particular, a thread 10 has been formed on the cylindrical shank 2, and it is preferred that the thread 10 is formed by a thread rolling operation. In the particular screw shown, the thread 10 has a crest diameter CD and a root diameter RD which are larger and smaller respectively than the diameter TD of the drilling tip 4. The difference between those diameters will be selected according to the intended use of the screw.

As the thread 10 is being formed on the blank 1, the thread rolling dies (not shown) are moved into engagement with that portion of the enlargement 8 which is exposed beyond the flange face 7. That is, the engaged portion of the enlargement 8 is located outside of the recess 6. As a result of that engagement, material is displaced from the enlargement 8 so as to create a final part 11 of the thread 10. In contacting the enlargement 8, the thread rolling dies are confronted with a larger body of material than at any other part of the axial extent of the shank 2. As a result, the thread rolling operation causes material to be displaced from the enlargement 8 so as to form the thread part 11, and some of that displaced material is shifted axially towards the head 3.

Figure 3:
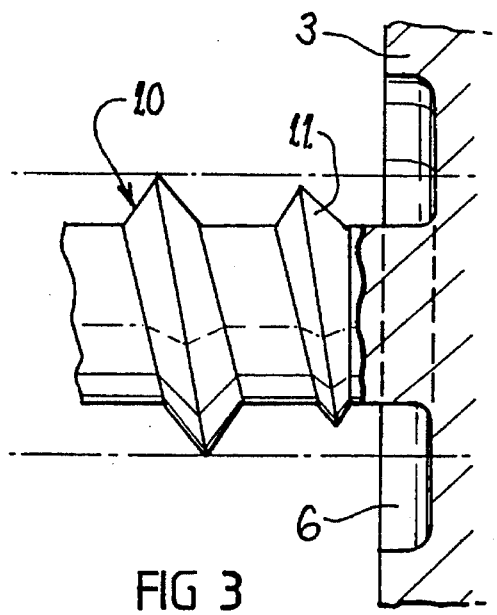
FIG. 3 is a partial view of a prior art screw.
Figure 4:
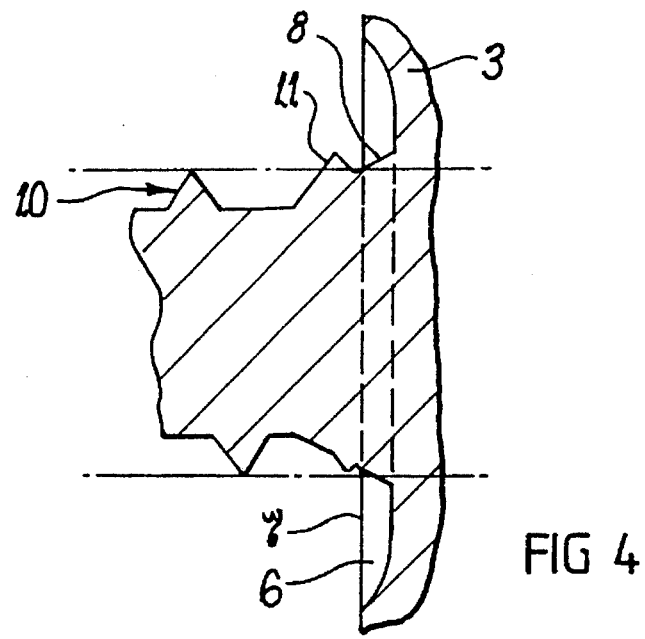
FIG. 4 is a partial view of a screw according to the invention.

FIG. 3 shows the way in which the thread part 11 appears on a conventional screw in which the thread 10 is formed by a thread rolling operation. FIG. 4 shows the same threaded part 11 as formed on a screw as shown in FIG. 2. It will be seen that the thread part 11 of the FIG. 4 arrangement is bulkier than that of the FIG. 3 arrangement, and has been shifted towards the head 3.

Figure 5:
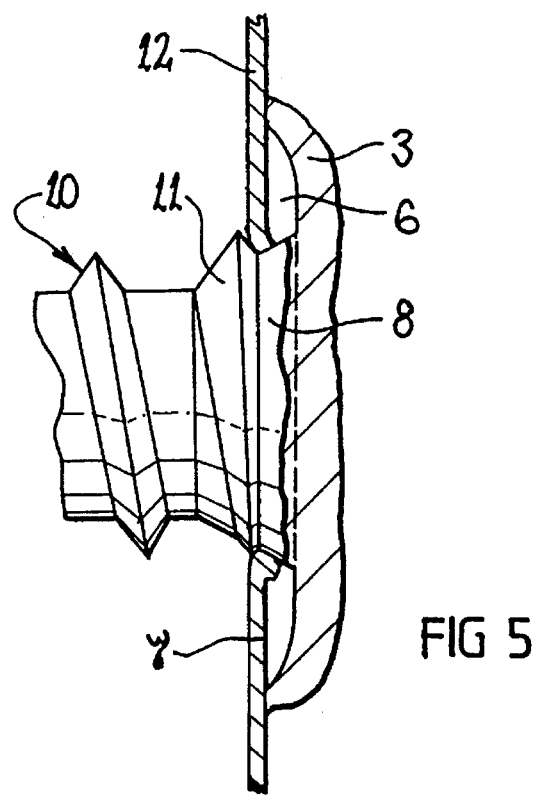
FIG. 5 illustrates a screw according to the invention engaged in a sheet of metal.

FIG. 5 shows the screw 9 of FIG. 2 engaged in a section of sheet metal 12. As shown in FIG. 5, the engaged section of sheet metal 12 is forced up the ramped portion of the enlargement 8 by the thread part 11 so as to be firmly locked onto the enlargement 8. In effect, metal sheet 12 is distorted by thread section 11 into wedging inter-engagement with enlargement 8.

Although the enlargement 8 is shown in the drawings as being of frusto-conical form, it is to be understood that other forms of enlargement 8 could be adopted. The essential requirement is that the enlargement, whatever its form, provides a body of material adjacent the head 3 with which thread rolling dies can react to produce a thread end part as described.

It will be evident from the foregoing that the present invention provides a significant and beneficial advance in self-drilling screw technology. A screw according to the invention has a wider range of uses than prior screws, and has significantly improved holding power when used with relatively thin structures.

Finally, it is to be understood that various alterations, modifications and/or additions may be introduced into the constructions and arrangements of parts previously described without departing from the spirit or ambit of the invention. It is therefore to be understood further that within the scope of the appended claims, the present invention may be practiced otherwise than as specifically described herein.

Having now described my invention, what I claim as new and desire to secure by Letters Patent is:

1. A method of making a self-drilling screw for use with both relatively thick metal plate and relatively thin metal sheet, comprising the steps of:

forming a blank comprising an elongate shank, and an enlarged head and a drilling tip disposed at respective opposite ends of said elongate shank, wherein said elongate shank is substantially cylindrical throughout substantially its entire axial length but has an enlarged section disposed adjacent to said enlarged head wherein the cross-sectional size of said enlarged section of said elongate shank progressively increases in a direction extending away from said drilling tip and toward said enlarged head, and wherein further, said drilling tip has a predetermined diametrical extent; and forming a first thread portion upon a portion of said elongate shank which extends between said drilling tip and said enlarged shank section, and having a crest diameter dimension which is greater than said diametrical extent of said drilling tip and a root diameter dimension which is less than said diametrical extent of said drilling tip such that said first portion of said thread is able to threadedly engage a relatively thick metal plate when said self-drilling screw is inserted through said relatively thick metal plate; and a second portion which also extends onto said enlarged section of said elongate shank such that said enlarged shank section and said second portion of said thread are able to distort a relatively thin metal sheet into wedging interengagement with said second portion of said thread and said enlarged shank section when said self-drilling screw is inserted through said relatively thin metal sheet.

2. A method of making a self-drilling screw as set forth in claim 1, wherein:

said thread is formed upon said portion of said elongate shank and upon said enlarged section of said elongate shank by causing rolling dies to be engaged with said portion of said elongate shank and said enlarged section of said elongate shank.

3. A method of making a self-drilling screw as set forth in claim 1, wherein:

said enlarged section of said elongate shank has a relatively short axial extent as compared to the axial extent of said elongate shank.

4. A method as claimed in claim 1 wherein the enlarged section of the shank of said blank is formed as a frusto-conical section.

5. A method of making a self-drilling screw as set forth in claim 4, wherein:

said frusto-conical enlarged shank section has sloped surfaces which are disposed at angles of between 15° and 45° with respect to the longitudinal axis of said screw.

6. A method as claimed in claim 5 wherein the enlarged section is formed such that its surfaces slope at an angle of about 30° with respect to the longitudinal axis of the screw.

7. A method as claimed in claim 1 wherein in forming the blank, a shallow recess is included in the head surrounding the enlarged shank section.

8. A method of making a self-drilling screw as set forth in claim 7, wherein:

in forming said blank, said enlarged head comprises an integral flange portion; and said recess is formed within said integral flange portion of said enlarged head.

9. A method of making a self-drilling screw as set forth in claim 7, wherein:

a portion of said enlarged shank section disposed closest to said enlarged head of said screw is disposed within said shallow recess.

10. A method of making a self-drilling screw as set forth in claim 7, wherein:

the axial extent of said enlarged shank section is between approximately two and four times the depth of said recess.

11. A method as claimed in claim 10 wherein the axial extent of said enlarged section is about three times the depth of said recess.

12. A method of making a self-drilling screw suitable for use with both relatively thick metal plate and relatively thin metal sheet, comprising the steps of:

forming a blank comprising an elongate shank, and an enlarged head and a drilling tip disposed at respective opposite ends of said elongate shank, wherein said elongate shank is substantially cylindrical throughout substantially its entire axial length but has an enlarged section disposed adjacent to said enlarged head wherein the cross-sectional size of said enlarged section of said elongate shank progressively increases in a direction extending away from said drilling tip and toward said enlarged head, and wherein further, said drilling tip has a predetermined diametrical extent; and forming a thread upon said elongate shank which is interposed between said drilling tip and said enlarged head such that a first end portion of said thread is formed upon said enlarged section of said elongate shank whereby said enlarged section of said elongate shank disposed adjacent to said head, and said first end portion of said thread which is formed upon said enlarged section of said shank, are able to distort said relatively thin metal sheet into wedging interengagement with said first end portion of said thread and said enlarged section of said elongate shank when said self-drilling screw is inserted through said relatively thin metal sheet, while a second portion of said thread, which is formed upon a portion of said elongate shank which is interposed between said drilling tip and said enlarged section of said elongate shank, and which has a crest diameter dimension which is greater than said diametrical extent of said drilling tip and a root diameter dimension which is less than said diametrical extent of said drilling tip, is able to threadedly engage a metal plate when said self-drilling screw is inserted through said relatively thick metal plate.

13. A method of making a self-drilling screw as set forth in claim 12, wherein:

said enlarged shank section is formed so as to have a substantially frusto-conical configuration.

14. A method of making a self-drilling screw as set forth in claim 13, wherein:

said frusto-conical enlarged shank section has sloped surfaces which are disposed at angles of between 15° and 45° with respect to the longitudinal axis of said screw.

15. A method of making a self-drilling screw as set forth in claim 14, wherein:

said sloped surfaces of said enlarged shank section are disposed at an angle of approximately 30° with respect to said longitudinal axis of said screw.

16. A method of making a self-drilling screw as set forth in claim 12, wherein:

said enlarged head of said screw is formed so as to have an integral flange portion which has an annular recess formed with in an undersurface portion thereof; and a portion of said enlarged shank section disposed closest to said enlarged head of said screw is disposed within said annular recess.

17. A method of making a self-drilling screw as set forth in claim 16, wherein:

said enlarged shank section has an axial extent which is approximately two to four times greater than the axial depth of said annular recess.

18. A method of making a self-drilling screw as set forth in claim 17, wherein:

said axial extent of said enlarged shank section is approximately three times the axial depth of said annular recess.

* * * * *